United States Patent [19]

Woodbridge

[11] Patent Number: 4,748,745
[45] Date of Patent: Jun. 7, 1988

[54] CHAIN SAW BRUSH FOR CLEANING SAW CUTS

[76] Inventor: Richard G. Woodbridge, 56 William St., Princeton, N.J. 08540

[21] Appl. No.: 19,207

[22] Filed: Feb. 26, 1987

[51] Int. Cl.⁴ .............................................. B27B 17/02
[52] U.S. Cl. ...................................... 30/383; 15/160; 30/123; 30/514
[58] Field of Search .................................. 30/381-387, 30/123, 144, 514, 516; 15/160, 246

[56] References Cited

U.S. PATENT DOCUMENTS

| | | |
|---|---|---|
| 109,436 | 11/1870 | Mayo . |
| 417,093 | 12/1889 | Robison . |
| 3,042,088 | 7/1962 | Fillion et al. ........................ 30/383 |
| 3,829,971 | 8/1974 | Anderson ............................. 30/383 |
| 4,193,193 | 3/1980 | Holzworth ........................... 30/382 |
| 4,211,007 | 7/1980 | Gibson ................................. 30/383 |
| 4,530,679 | 7/1985 | Reynolds ............................. 474/92 |

FOREIGN PATENT DOCUMENTS 127962 2/1901 Fed. Rep. of Germany ........ 30/144

Primary Examiner—Douglas D. Watts
Attorney, Agent, or Firm—Richard C. Woodbridge

[57] ABSTRACT

A brush is attachable to the top edge of a chain saw blade and is used to remove saw dust and clogged debris from a chain saw cut. Two brackets attached to the blade and the motor cover support an expandible bar that carries the bristles. An agitator is attached to the bristle carrying bar and includes a pair of rollers adapted to contact the moving chain. The brush is employed to clean the chain saw cut in order to keep the saw from binding or becoming gummed up with saw dust. The agitator may be selectively employed depending upon the difficulty of the cleaning task.

12 Claims, 2 Drawing Sheets

CHAIN SAW BRUSH FOR CLEANING SAW CUTS

BACKGROUND OF THE INVENTION

1. Field of the Invention

The invention relates to a cleaning device attachable to a chain saw for the purpose of cleaning chain saw cuts.

2. Description of the Related Art

The problem of keeping saw blades clean has received some attention in the prior art. For example, U.S. Pat. Nos. 109,436 and 417,093 disclose brush attachments used for cleaning the teeth of band saws and circular saws respectively. In those cases the brushes contact the saw teeth directly and not the cut made by the saw teeth. The foregoing represents efforts to keep old fashioned, non-portable saws from becoming saw-dust bound.

Over the last few decades, with the advent of the chain saw, the problem of keeping the saw clean has become more acute. There are basically two problems. The first problem is that saw dust clogs the chain saw motor and decreases the efficiency of the cutting teeth. The second, and more important problem, is that saw dust stuck in the chain saw cut will cause the chain to snag in the cut. On occasion, this can have serious, if not fatal, consequences. Insofar as can be determined, no serious effort has been made to attack this problem directly even though there have been several indirect attempts. For example, U.S. Pat. No. 4,193,193 describes a guard for a chain saw which is intended to keep individuals from getting hurt if the chain should grab.

U.S. Pat. No. 4,211,007 describes a method for decreasing the saw dust problem. That method comprehends the use of two saw dust knock-out holes in the rear of the guide bar.

The concept of attachments for chain saws is known though not widely used. For example, it is known to use self lubricating devices in order to keep a chain saw oiled.

Lastly, efforts have been made to improve the structure of a chain saw in order to minimize the chance of saw dust clogging. See, in particular, U.S. Pat. Nos. 3,829,971 and 4,530,679. In each case the prior art appears to attack the symptom of the problem rather than deal with the problem directly.

SUMMARY OF THE INVENTION

Briefly described the invention comprises a brush device attachable to the top edge of a chain saw blade and used to remove saw dust and clogged debris from a chain saw cut. A pair of brackets are mounted on the chain saw blade and the motor cover in such a fashion as to give the chain clearance to pass there through. The two brackets carry an expandible bar which in turn supports a row of relatively stiff long bristles. The two mounting brackets permit the bar to wiggle or vibrate a little bit in a direction substantially parallel to the long dimension of the chain saw blade. An optional agitator mechanism is attached to the bar and adapted to contact the underside of the moving chain. A saw chain typically includes a row of teeth carried on links having hour glass shapes. A pair of rollers attached to the underside of the agitator rides on the bottom side of the chain in such a fashion as to couple agitating motion to the resilient bar thereby causing the bristles to vibrate. The agitator is an optional feature depending upon the severity of the cut clogging problem. These and other features of the invention will be more fully appreciated by referring to the following drawings.

DETAILED DESCRIPTION OF THE PREFERRED EMBODIMENT

During the course of the description like numbers will be used to describe like features as found in the various figures which illustrate the invention.

Figure 1:
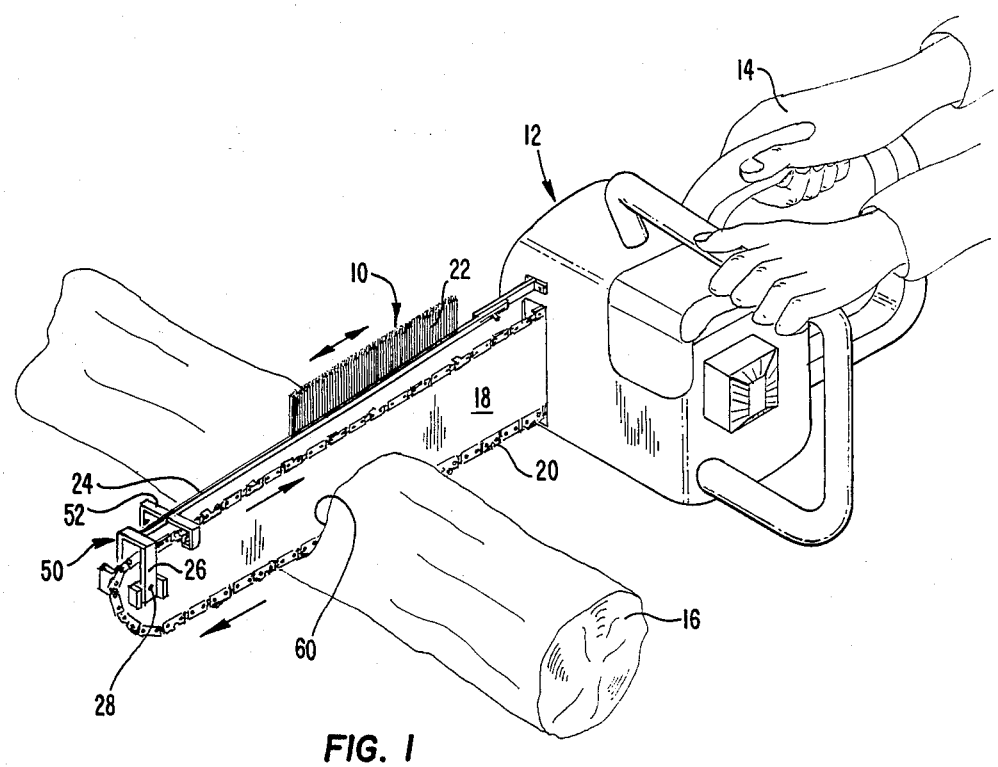
FIG. 1 is a perspective view of the preferred embodiment of the invention shown as the chain saw makes a typical chain saw cut.
Figure 1A:
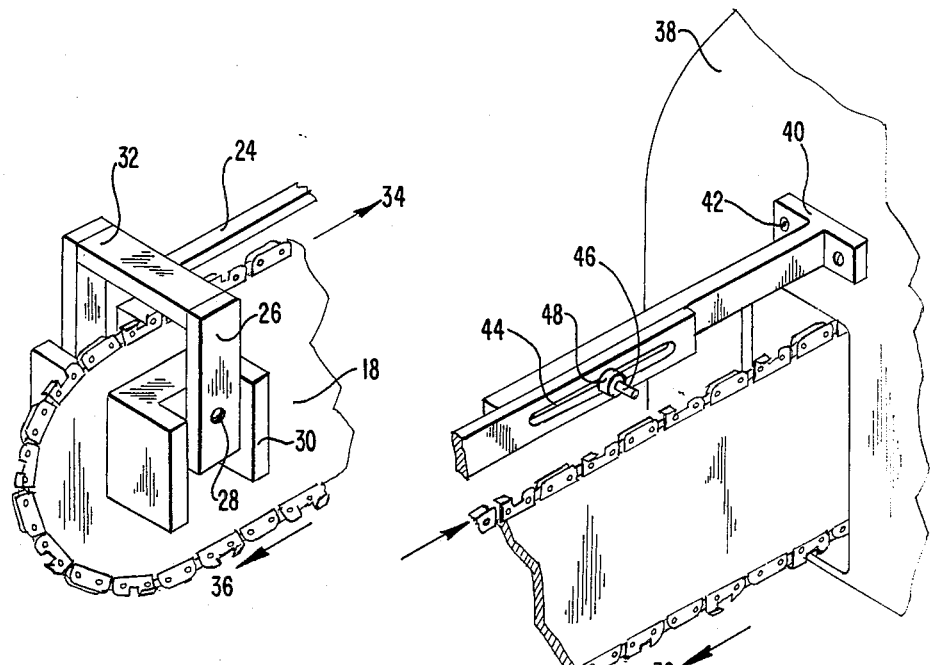
FIG. 1A is a detailed perspective view of the front mounting bracket.

The preferred embodiment of the invention 10 is illustrated attached to a conventional chain saw 12 in FIG. 1. The hands 14 of the chain saw operator guide the blade 18 and moving chain 20 into the cut 60 in log 16. The chain 20 normally moves away from the chassis 38 on the underside of blade 18 in the direction of arrow 36 and toward chassis 38 on the top side of blade 18 in the direction of arrow 34.

Figure 1B:
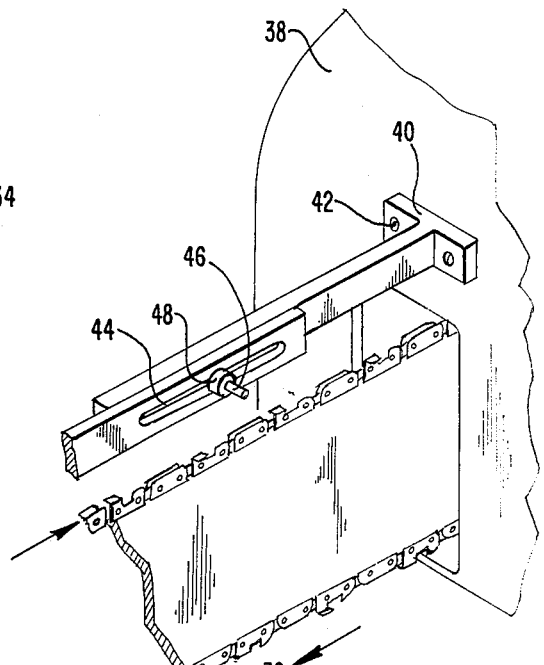
FIG. 1B is a detailed perspective view of the second mounting bracket shown attached to the motor cover and the bar length adjustment mechanism.
Figure 3:
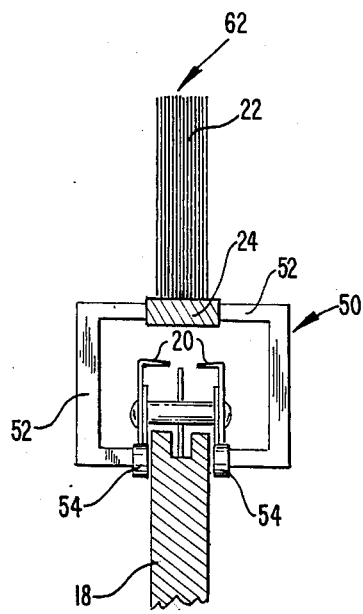
FIG. 3 is a cross sectional view of the agitator mechanism illustrating the manner in which the rollers thereof contact the moving underside of the chain.

The invention 10 essentially comprises a plurality of brush bristles 62 forming a brush 22 carried on a resilient bar 24 supported by the front end by a front bracket 26 and at the rear end by a chassis mounted rear bracket 40 attached to motor cover 38. Rear bracket 40 is attached by metal screws 42 to the metal case 38 of the chassis of the chain saw 12. Front bracket 26 is attached to blade 18 by a pair of U-shaped mounting blocks 30 located on opposite sides of the blade 18. A metal pin or rivet 28 passes through the two blocks 30 and the blade 18 and serves to support the two vertical arms of the front mounting bracket 26. Pin 28 is important because it holds the bracket 26 in place yet permits it to wriggle and vibrate a bit in order to accommodate the backward and forward motion of the brush 22. The two vertical arms of the bracket 26 support a horizontal cross member 32 which in turn supports the resilient bar 24. Brush bristles 22 are preferably made from a hard plastic material such as Nylon ®. Bristles 22 may vary in length from between ¼ of an inch to 2 inches but are preferably in the neighborhood of 1 inch. The width of the brush bristles 22 should not exceed the width of the chain 20 as shown in FIG. 3. Accordingly the width of the pile of the brush bristles 22 would normally not exceed ¼ of an inch. A length adjusting and vibration compensating mechanism is illustrated in FIG. 1B. The resilient carrying bar 24 includes a slot 44 therein adapted to receive a threaded stud 46 secured loosely in place by a threaded nut 48. The length adjuster serves two purposes. First, it permits the cut cleaning apparatus 10 to be attached to chain saws of various sizes. It is well known that chain saw are available in a variety of sizes ranging from approximately 12 inches for small home saws up to 26 inches or more for industrial lumbering equipment. Second, the length adjuster also permits a modest amount of resilient give in the mechanism so that the resilient bar does not absorb all of the stress of the cleaning activity.

The invention is normally used to make a cut 60 in a piece of wood 16 in the conventional fashion as shown in FIG. 1. After the cut is made the chain saw 12 is typically inverted, so that the top portion of the blade is facing downward. The brush bristles 62 are then placed in the cut 60 and moved back and forth to clear the debris out of the cut 60. This is typically down when the cut 60 is sufficiently deep to cause the chain saw to begin to bind. An experienced chain saw operator can tell by the feel and sound of the chain saw 12 if the chain saw 12 is having difficulty cutting through wood due to the accumulation of saw dust in the cut 60 or on the saw itself. This problem is frequently associated with soft gummy woods such as white pine but is probably a problem with other woods too, depending upon their moisture content, sap characteristics, size, time of year, and the nature of the nature of the chain saw being used.

If the brush 22 tends to bind in cut 60 or if it doesn't do an adequate job of clearing the debris, then the agitator attachment 50 may be employed to enhance the cleaning characteristics of the brush bristles 62. Agitator 50 comprises a pair of U-shaped arms 52 which attach the carrying bar 24 to a pair of rollers 54 located on opposite sides of blade 18. A typical saw chain 20 includes a plurality of links which carry the teeth on one side and are normally bare on the other. The links have an hour glass shape such that as they pass over rollers 54 they cause the arms 52 to vibrate carrying bar 24 which in turn vibrates brush bristles 62. Therefore, the lumpy shape of the underside of the chain 20 causes the agitator 50 to vibrate the bristles 62 both up and down and back and forth. The up and down motion comes from the lumpy nature of the underside of the chain 20. The back and forth motion comes from the fact that the chain is traveling in direction 34 thereby causing the rollers 54 to be carried in that direction for a short period of time and then spring back due to the resilience of the bracket 26 and carrying bar 24.

Figure 2:
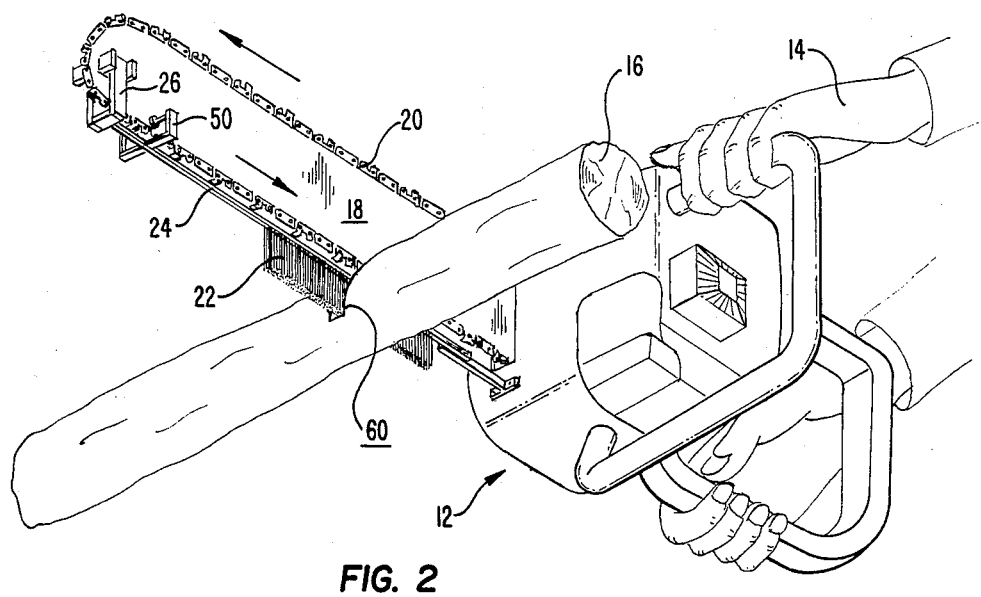
FIG. 2 shows the preferred embodiment of the invention as employed to clear a chain saw cut.

Normally, if the invention 10 is used without the agitator 50, it is not necessary to turn on the chain saw 12. However, for those difficult situations where enhanced cut cleaning is necessary, the use of agitator 50 can be employed. Use of agitator 50 requires that the chain saw 12 be turned on and turned upside down or sidewise with respect to its normal attitude. This circumstance is acceptable for short periods of time with most chain saws and is not a problem if the cut 60 is horizontal rather than vertical as shown in FIGS. 1 and 2.

While the invention has been described with reference to the preferred embodiment thereof it will be appreciated by those of ordinary skill in the art that various changes can be made to the structure and parts of the invention without departing from the spirit and scope of the invention as a whole.

I claim:

1. A chain saw cut cleaning apparatus for use with a chain saw having a saw blade, said apparatus comprising:
    cleaning means for cleaning out a chain saw cut, said cleaning means comprising a brush including bristles and a bristle carrying bar for supporting said bristles;
    a bracket means attached to said bristle carrying bar of said cleaning means for attaching said cleaning means to said chain saw; and,
    agitator means attached to said brush for agitating said brush.

2. A chain saw cut cleaning apparatus comprising:
    a brush including bristles and a bristle carrying bar means for supporting said bristles;
    a bracket means for attaching said brush to said chain saw; and,
    agitator means attached to said brush for agitating said brush.

3. A chain saw cut cleaning apparatus for use with a chain saw having a saw blade and a chain used to cut wood, said apparatus comprising:
    brush bristles;
    a bristle carrying bar attached to said brush bristles; and,
    bracket means for attaching said bristle carrying bar to said chain saw;
    wherein said bristle carrying bar and said brush bristles are located in substantially the same plane as said chain saw blade and on the opposite edge thereof from the side of said chain saw blade that makes cutting contact with the wood to be cut.

4. The apparatus of claim 1 wherein said agitator means include chain contacting means for transmitting agitating motion through said agitator means to said brush.

5. The apparatus of claim 4 wherein said bracket means comprise:
    a front bracket attachable to said saw blade, said front bracket including two arms on opposite side of said saw blade and a horizontal member connected to said arms in such a fashion as to straddle the chain and provide enough clearance so that it can pass easily there through, said horizontal member being connected to said bristle-carrying bar, and,
    a rear bracket means for attaching the rear portion of said bristle-carrying bar to the chassis of said chain saw.

6. The apparatus of chain 5 wherein the chain contacting means of said agitator means comprises a pair of rollers which contact the underside of said saw chain opposite the saw teeth normally carried by said saw chain.

7. The apparatus of claim 6 further comprising:
    length adjusting means for adjusting the length of the bristle-carrying bar to accommodate chain saws blades of different lengths.

8. The apparatus of claim 7 wherein said bristlecarrying bar comprises two sections, one of which has a slot therein and said length adjusting means comprises a stud in one of the sections for passing through said slot, said stud including thread thereon for carrying a nut for engagement with said stud.

9. The apparatus of claim 8 further including:
    a rod-like means for attaching said front bracket to said saw blade and for permitting limited movement of said bracket with respect to said blade.

10. The apparatus of claim 9 wherein said brush bristles are in the range of ½ inch to 2 inch long.

11. The apparatus of claim 10 wherein said brush bristles are approximately 1 inch long.

12. The apparatus of claim 11 wherein said bristles comprise a Nylon ®-like plastic material.

* * * * *